United States Patent
Nygren, Jr.

[11] Patent Number: 6,062,527
[45] Date of Patent: May 16, 2000

[54] FLEXURALLY HINGED TRIPOD SUPPORT BOOM

[75] Inventor: William D. Nygren, Jr., Denver, Colo.

[73] Assignee: Lockheed Martin Corporation, Bethesda, Md.

[21] Appl. No.: 09/106,683

[22] Filed: Jun. 29, 1998

[51] Int. Cl.[7] ............................. F16M 1/00; F16M 13/00; E04H 12/18

[52] U.S. Cl. ........................ 248/665; 248/605; 248/596; 248/591

[58] Field of Search ................................ 248/165, 288.11, 248/605, 596, 591, 665; 52/108, 646, 645, 632, 71, 118, 641, 82, 638; 343/840, 753, 882, 915, 85.3; 29/467; 244/158 R, 137 R; 414/563, 138.3

[56] References Cited

U.S. PATENT DOCUMENTS

| | | |
|---|---|---|
| 1,577,234 | 3/1926 | Hubeny et al. . |
| 2,982,379 | 5/1961 | Fisher . |
| 3,579,244 | 5/1971 | Dempsey et al. .......... 343/797 |
| 3,599,218 | 8/1971 | Williamson et al. ...... 343/840 |
| 3,618,111 | 11/1971 | Vaughn ...................... 343/840 |
| 3,862,528 | 1/1975 | Meissinger ................. 52/108 |
| 4,101,897 | 7/1978 | Morrison .................... 343/715 |
| 4,380,013 | 4/1983 | Slysh ........................... 343/753 |
| 4,426,821 | 1/1984 | Moore et al. ............... 52/646 |
| 4,527,362 | 7/1985 | Tobey et al. ................ 52/71 |
| 4,539,786 | 9/1985 | Nelson ....................... 52/646 |
| 4,557,097 | 12/1985 | Mikulas, Jr. et al. ...... 52/646 |
| 4,569,176 | 2/1986 | Hedgepeth et al. ........ 52/645 |
| 4,578,920 | 4/1986 | Bush et al. ................. 52/645 |
| 4,599,832 | 7/1986 | Benton et al. .............. 52/118 |
| 4,814,784 | 3/1989 | Pallmeyer ................... 343/882 |
| 4,819,399 | 4/1989 | Onada ......................... 52/646 |
| 4,831,807 | 5/1989 | Bolt ............................. 52/641 |
| 4,882,884 | 11/1989 | Browne ....................... 52/82 |
| 4,969,301 | 11/1990 | Warden ....................... 52/108 |
| 4,995,212 | 2/1991 | Morgan et al. ............. 52/646 |
| 5,014,484 | 5/1991 | Tanizawa et al. .......... 52/646 |
| 5,040,349 | 8/1991 | Onoda et al. ............... 52/646 |
| 5,125,206 | 6/1992 | Motohashi et al. ........ 52/646 |
| 5,154,027 | 10/1992 | Warden ....................... 52/108 |
| 5,163,262 | 11/1992 | Adams ........................ 52/646 |
| 5,228,258 | 7/1993 | Onoda et al. ............... 52/646 |
| 5,333,725 | 8/1994 | Douglas ...................... 198/632 |
| 5,363,627 | 11/1994 | Wilson ........................ 52/641 |
| 5,406,767 | 4/1995 | Pech et al. .................. 52/638 |
| 5,553,961 | 9/1996 | Olden ......................... 403/119 |
| 5,603,595 | 2/1997 | Nygren, Jr. ................. 411/366 |
| 5,695,306 | 12/1997 | Nygren, Jr. ................. 411/433 |

FOREIGN PATENT DOCUMENTS 186203  4/1982  Japan .

Primary Examiner—Derek J. Berger
Assistant Examiner—Michael Nornberg
Attorney, Agent, or Firm—Holme Roberts & Owen, LLP

[57] ABSTRACT

An improved support boom is disclosed for supporting instrumentation on extraterrestrial vehicles. The support boom includes first and second support legs which are each pivotably mountable at corresponding first ends to a support structure and which are interconnected at second ends to define a support boom structure. In one embodiment, flexure members are interposed in each of the support legs so as to pivot the support boom structure from a stowed position to a deployed, cantilevered position. The flexure members may be elongated with an arcuate cross-sectional configuration when straight (e.g., of carpenter's tape construction). Preferably, three support legs are included to define a tripod support arrangement, wherein each of the support legs includes at least one flexure member. In this regard, one of the support legs may be advantageously disposed for pivotal movement coincident with that of the longitudinal center axis of the support boom, wherein such support leg may include two oppositely oriented flexure members.

29 Claims, 4 Drawing Sheets

FLEXURALLY HINGED TRIPOD SUPPORT BOOM

FIELD OF THE INVENTION

The present invention relates to deployable structures (e.g., for supporting instrumentation on extraterrestrial vehicles), and more particularly, to a support boom extendable from a stowed position to a cantilevered, deployed position.

BACKGROUND OF THE INVENTION

Various techniques have been used to deploy instrumentation payloads from spacecraft. Typically, deployment is initiated from a storage bay after the spacecraft has reached a selected orbit or other extraterrestrial location. The instrumentation may include solar panels, measurement equipment, imaging devices, communication antennae and the like. As can be appreciated, such instrumentation may be very sensitive in nature and should be deployed with minimal vibration or shock. Further, in many situations, the deployment of such devices must be achieved with high reliability and positional accuracy (e.g., antennae positioning to transceive signals from specific earth-based stations).

The design of deployment devices that are capable of safely, accurately, reliably and repeatably delivering equipment from a stowed position to a deployed position presents a number of challenges. For example, the deployment device should comprise an actuator that can selectively apply the necessary energy to physically move the instrumentation to a deployed position, yet do so in a manner that avoids detrimental acceleration/deceleration. As such, any mechanical or other uncertainty (e.g., frictional resistance variability) that may effect an increase in the design drive force should be reduced. Further, the actuator should be interfaced with support componentry in a manner that reduces any potential for operational failure or maintenance requirements. More generally, the actuator itself should be designed so that the failure of any single piece of mechanically or electrically responsive componentry does not disable the actuator. Finally, the actuator and support componentry should interface to yield positional accuracy/rigidity relative to the spacecraft in a deployed position while also providing a compact arrangement in the stowed position.

SUMMARY OF THE INVENTION

A broad object of the present invention to provide an enhanced instrument support structure that can be deployed from a stowed position to a deployed position relative to an extraterrestrial vehicle. It is a related objective to provide such a deployable support structure with reduced complexity and in a cost-effective manner.

A further particular objective of the present invention is to provide an enhanced support structure that is capable of safely deploying equipment from a stowed position to a deployed position with reduced risk of damage to the equipment during deployment. It is a related objective to provide such a deployable support structure with reduced drive force requirements and maintenance requirements for both support structure componentry and deployed equipment.

It is still a further objective of the present invention to provide a support structure that accurately and reliably positions instrumentation relative to an extraterrestrial vehicle, and relatedly, that can maintain such positioning during use. As to reliability, it is a particular objective to provide a deployable support structure that reduces performance reliance on the operability of any single actuator component.

One or more of the above objectives and additional advantages can be realized by the support boom of the present invention which includes first and second support legs that are pivotably mountable at their first ends to a support structure (e.g., a storage bay of an extraterrestrial vehicle). The second ends of the first and second support legs are interconnected to define a support boom structure. The inventive support boom further comprises a flexure means for pivoting the support boom structure from a stowed position to a deployed, cantilevered position. As will be appreciated, the utilization of two support legs to collectively define a support boom structure that is deployable via a flexure means that can flex from a first position (e.g., when stowed) to a second position (e.g., when deployed) yields an arrangement that can safely, accurately, repeatably and reliably position instrumentation mounted thereupon.

In one aspect, the inventive support boom may further include a third support leg that is pivotably mountable at its first end to the support surface and that is interconnected at its second end with the second ends of the first and second support legs to further define the overall support boom structure. The first ends of the first, second and third support legs are mountable at corresponding first, second and third mounting locations that define a polygonal configuration to yield enhanced support and reduced vibrational exposure (i.e., by operatively defining a second node at the free end of the boom structure). In this regard, the mounting locations for the first, second and third support legs may advantageously define a triangular configuration. By way of primary example, an isosceles triangle may be defined, wherein the triangle bisector lies in the same plane as the plane in which the free end of the support boom structure is pivotable (i.e., for deployment).

In a related aspect of the present invention, the above-noted flexure means may include at least one unitary flexure member interposed within each of the support legs, each of such flexure members being disposed to resiliently flex from a first position (i.e., when stowed) to a second position (i.e., when deployed). Preferably, the spring-force for each of the flexure members will be selected to be separately sufficient to drive the entire support structure, and any instrumentation mounted thereupon, from the stowed position to the deployed position, thereby yielding enhanced reliability via flexure redundancy. Each of the flexure members may advantageously be of an elongated construction with an arcuate cross-sectional configuration along the length thereof when straight and with a flattened cross-sectional configuration in bent regions when folded. Such construction allows the flexure members to resiliently flex from a folded, u-shaped configuration in their first, stowed position to a substantially straight configuration in their second, deployed position (e.g., as viewed from one of the top/bottom or side). As will be appreciated, the utilization of such flexure members not only provides for a relatively even application of force when deploying the boom structure (e.g., due to friction reduction), but also serves to rigidly maintain, or lock, the support boom in the deployed position. That is, when the arcuate flexure members are in their first, stowed position, each flexure member will be resiliently bent (e.g., wherein each flexure member will have a substantially flat cross-section at its bending or pivot axis), and when deployed the arcuate flexure members will resiliently flex and lock into a straightened configuration (e.g., wherein each flexure member will have an arcuate cross-section along the entire length thereof).

In a further related aspect of the present invention, one or more of the support legs may include a hinge support comprising first and second members for defining a hinge joint therebetween, wherein the corresponding flexure member extends between the first and second support members. Adjacent portions of the first and second support members may be contoured to combinatively define a u-shaped surface with a flat, cross-section at the hinge joint when the support boom is in a stowed position. Such u-shaped, flat surface supportably contacts a flattened portion of the corresponding flexure member when such flexure member is in a u-shaped configuration during stowage. In this regard, a resilient member may be interposed between the first and second support members so as to cause the hinge support to bear against and thereby tension the corresponding flexure member during stowage.

In yet another related aspect of the invention, at least two flexure members may be interposed within one of the support legs. In this regard, the two flexure members may be positioned so that when they are in their first, stowed positions, the folded, u-shaped configuration of one flexure member faces a substantially opposite direction from the folded, u-shaped configuration of the other flexure member (e.g., as viewed from one of the top/bottom or side).

In one arrangement, a tripod support boom structure is defined, wherein first and second support leg assemblies of equal length are mounted at one end via corresponding brackets to spaced locations on a supporting structure and converge to interconnect at their other ends via an instrumentation mounting assembly. The first and second support leg assemblies each comprise a flexure member interposed between their corresponding mounting brackets and a corresponding hinge support assembly, wherein the first and second leg assemblies are pivotable in tandem about a common hinge axis. A third support leg assembly is also mounted at one end via a mounting bracket to the supporting structure, wherein the mounting brackets for the first, second and third support leg assemblies define an isosceles triangle. The other end of the third support leg assembly is connected to the instrumentation mounting assembly. The third leg assembly also comprises at least one and preferably a plurality of flexure members, wherein the corresponding pivot axis of the third support leg assembly is parallel to the pivot axis of the first and second support leg assemblies. Each of the leg assemblies is provided so that each corresponding flexure member is folded into a u-shaped configuration when the tripod support boom is in a stowed position (e.g., as viewed from the top/bottom or side) and will resiliently flex to a straight configuration to pivotably drive the instrumentation mounting assembly into the desired position when deployed. As will be appreciated, the mounting brackets and flexure members for each of the first, second and third support leg assemblies may be disposed so that the support boom extends substantially parallel to the supporting structure when in the stowed position, and so that the instrumentation mounting assembly will pivot through an arc and into a deployed position in which the support boom extends outwardly and away from the supporting structure. The flexure members may be readily constructed from or into a configuration corresponding with that which is commonly referred to as "carpenter's tape", and may comprise stainless steel, beryllium, a shape memory alloy or any other material that can be flexed to provide an appropriate drive force for use in the present invention.

Numerous additional modifications, variations and advantages will become apparent upon consideration of the further description that follows.

DETAILED DESCRIPTION

Figure 1:
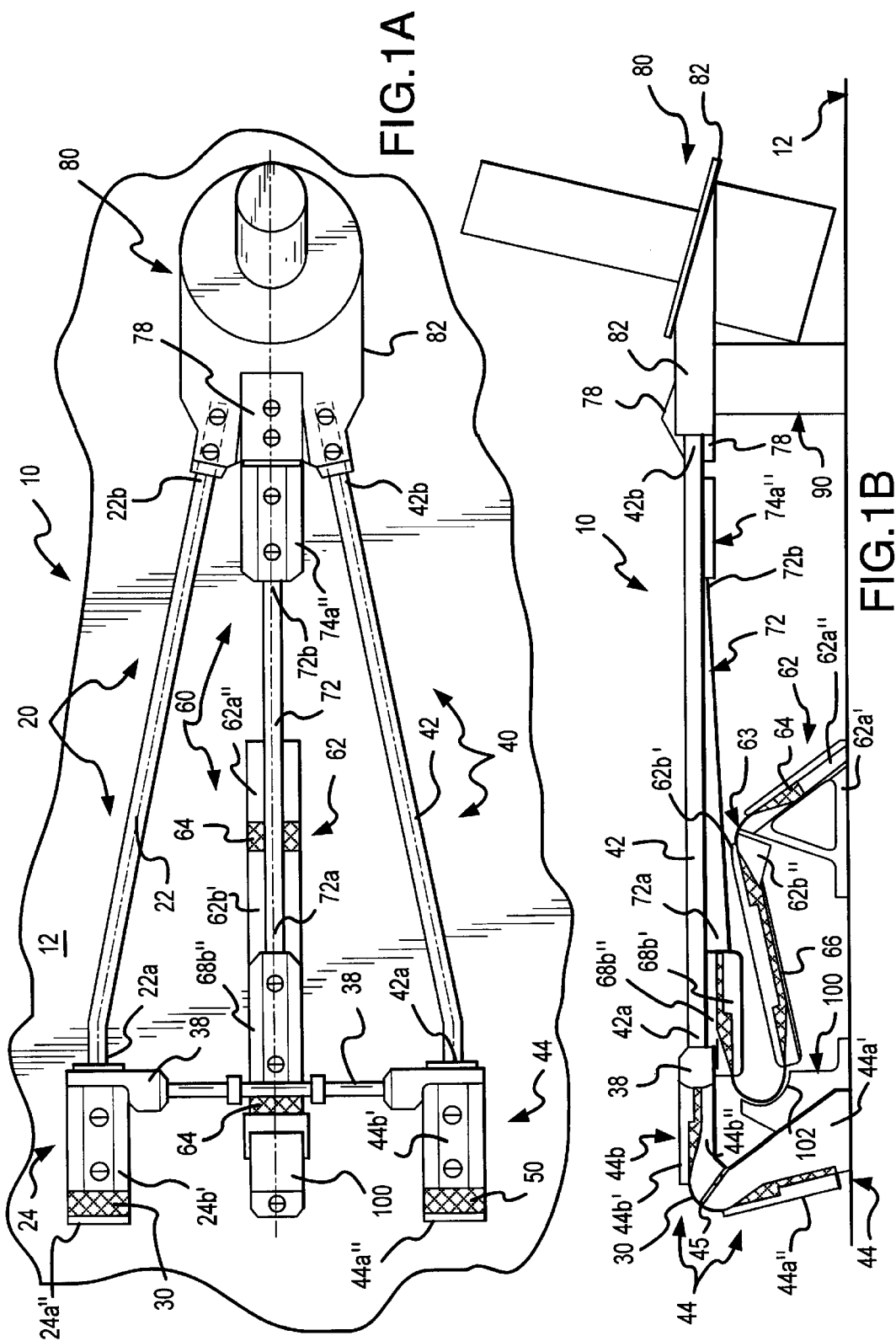
FIG. 1A is a front view of a stowed support boom structure defining one embodiment of the present invention.
FIG. 1B is a side view of the embodiment of FIG. 1A.
Figure 2:
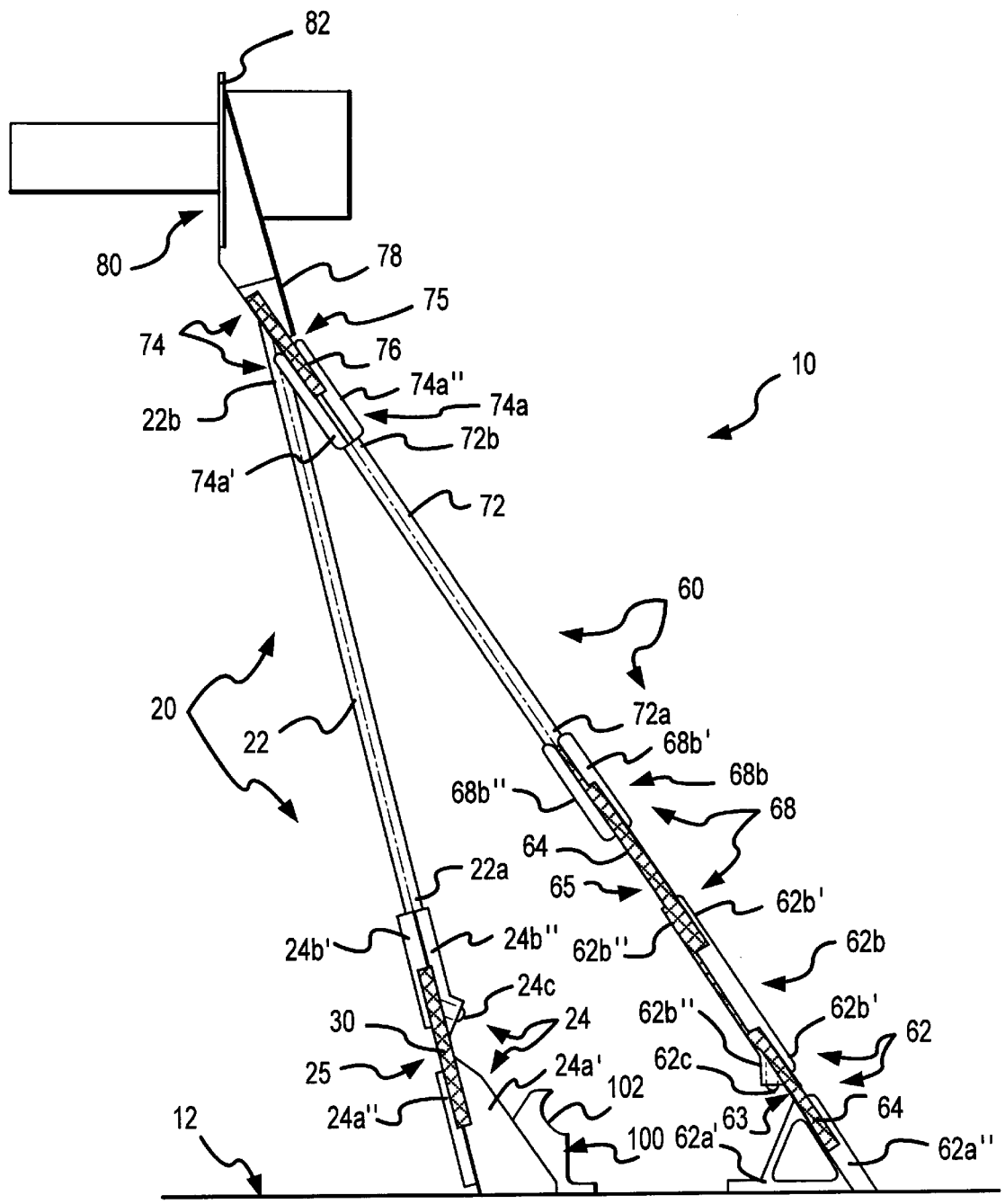
FIG. 2 is said view of the embodiment of FIG. 1A in the deployed position.

FIGS. 1A–3C illustrate one embodiment of a flexurally hinged tripod support boom of the present invention. Generally, the support boom structure 10 comprises a first support leg assembly 20, a second support leg assembly 40, and a third support leg assembly 60. Each of the first support leg assembly 20, the second support leg assembly 40, the third support leg assembly 60 are mounted at one end to a supporting surface 12 (e.g., the interior surface of a deployment bay of a spacecraft) and interconnected at their other end via a mounting assembly 80 to support equipment (e.g., antennae, cameras, and/or instruments) thereon. The first, second and third support leg assemblies 20, 40 and 60 are selectively deployable from a compact, stowed position, as shown in FIGS. 1A–1C, (e.g., within the deployment bay) to an extended, deployed position, as shown in FIG. 2, wherein the free end of the support boom structure 10 is positioned so that mounting assembly 80 is in an operative position for the equipment mounted thereupon.

Each of the first and second support leg assemblies 20, 40 includes, respectively, an elongated body member 22, 42, a hinge support assembly, 24, 44, and a flexure member 30, 50. As will become apparent, flexure members 30, 50 not only provide for hinged, or pivotable, movement of the support boom structure (10) relative to supporting surface 12, but also provide driving force for such movement upon deployment as well as the maintenance, or locking, of the boom structure 10 into the deployed position after deployment. The body members 22, 42 are of equal length and are of a relatively rigid, tubular construction (e.g., comprising an aluminum and/or titanium alloy). The body members 22, 42 are rigidly interconnected at first ends 22a, 42a via a bipod cross-connecting member 38 to facilitate tandem, pivotal movement of the body members 22, 42 as a planar unit from the stowed position to the deployed position, and to enhance the stability of the support boom structure 10 (i.e., during pivotable movement and while in the deployed, cantilevered position). To further enhance the stability and strength of the support boom structure 10, the longitudinal axes of the elongate, body members 22, 42 of the first and second support legs 20, 40, respectively, are oriented in a nonparallel, converging manner, wherein the body members 22, 42 are connected at second ends 22b, 42b to the mounting assembly 80, and wherein the body members 22 and 24 define a triangular configuration with the bipod connecting member 38 (see FIG. 1A).

Figure 3C:
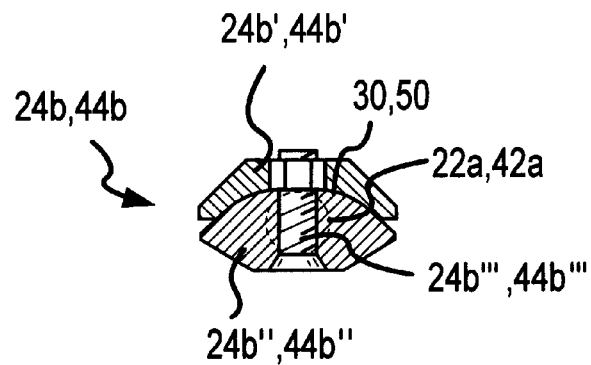
FIG. 3C is a cross-sectional end view of the first or second support leg assemblies of the embodiment of FIG. 1A taken at line 3C—3C of FIG. 3A.
Figure 3A:
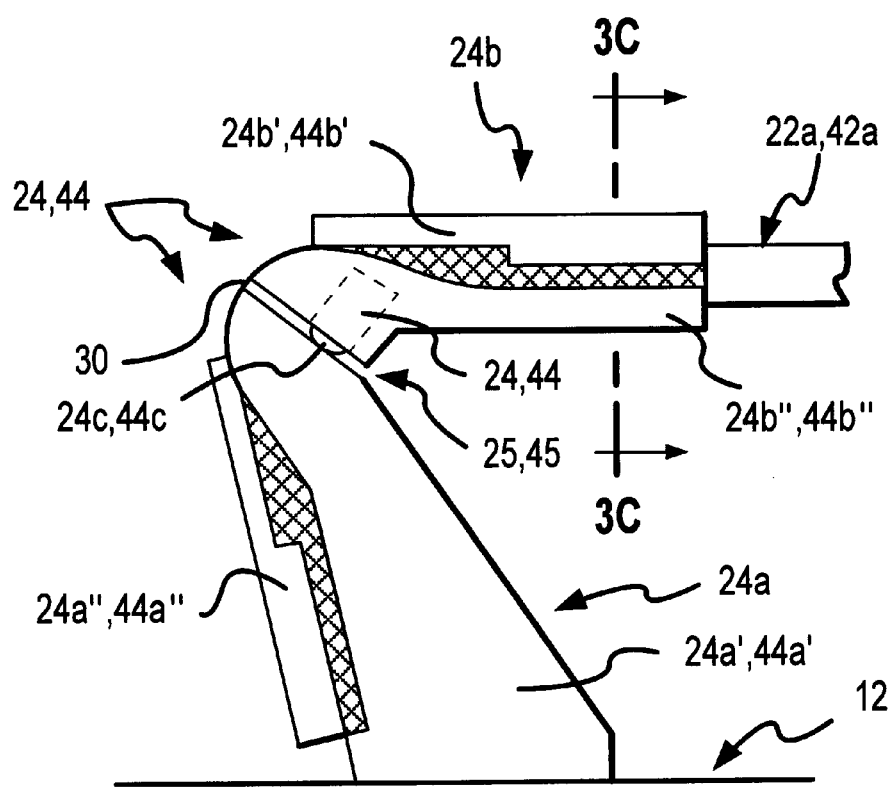
FIG. 3A is a side view of part of the first or second support leg assemblies of the embodiment of FIG. 1A in a stowed position.
Figure 3B:
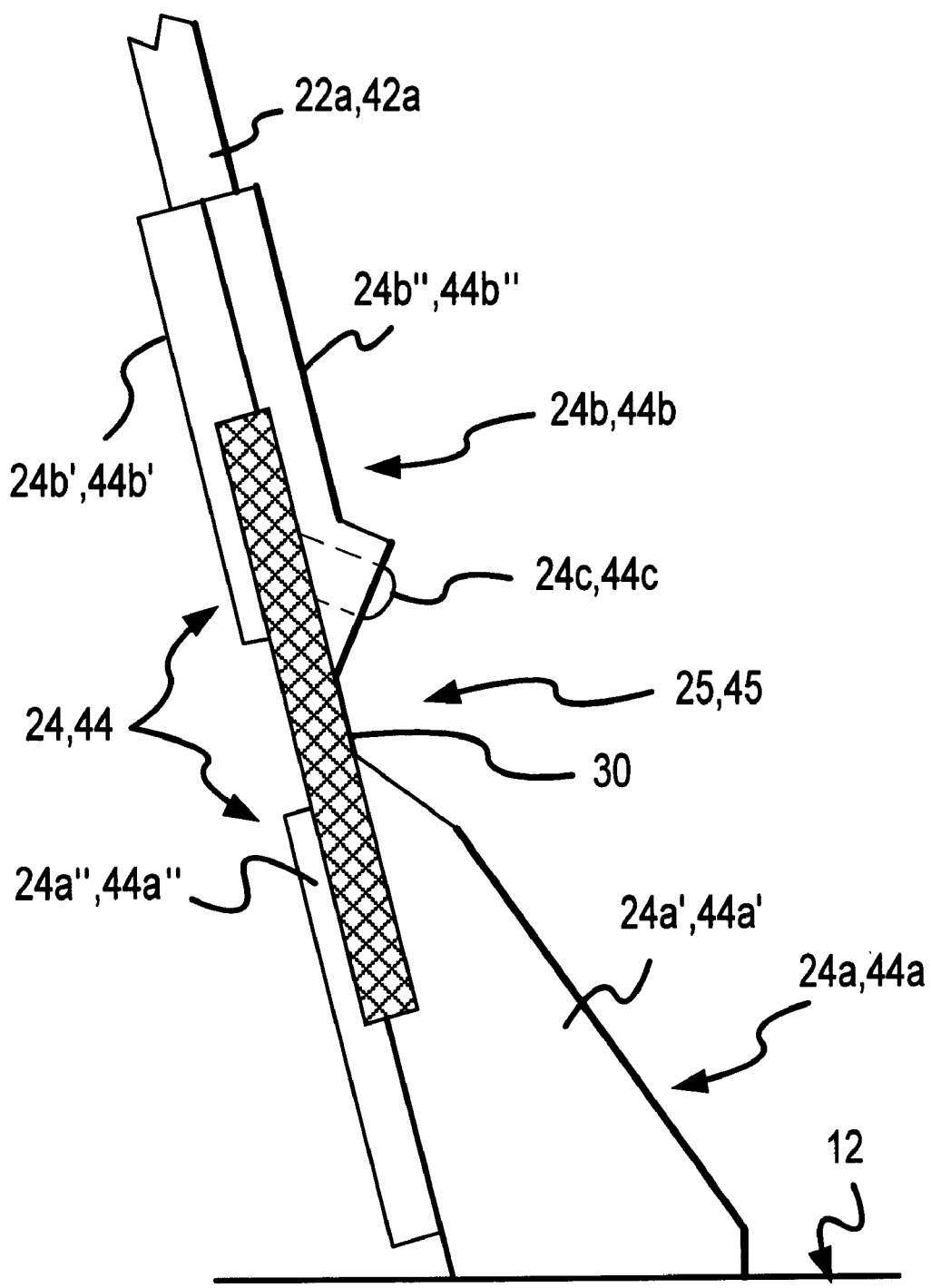
FIG. 3B is a side view of part of the first or second support leg assemblies of the embodiment of FIG. 1A in a deployed position.

As best illustrated in FIGS. 3A, 3B, and 3C (equally applicable to either of the first or second support leg assemblies 20 or 40), each hinge support assembly 24, 44 comprises, respectively, a mounting bracket 24a, 44a for rigidly mounting the first and second support leg assemblies 20, 40 to a support surface 12 (e.g., to the inner surface of a deployment bay). Each hinge support assembly 24, 44 also includes a support member 24b, 44b, respectively, for interconnection with the first end 22a, 42a of body member 22, 42 and to the flexure member 30, 50. As shown in FIG. 3C, the support member 24b, 44b may comprise opposing first support blocks 24b' and 24b", 44b' and 44b" (e.g., wherein at least a portion of each opposing surface being arcuately configured in end-view cross-section to conformally sandwich the flexure member 30, 50, therebetween) and a connection means 24b''', 44b''' (e.g., one or more screws/nuts) for securing the opposing first support blocks 24b' and 24b", 44b' and 44b" to the first end 22a, 42a of body member 22, 42 and to flexure member 30, 50. Similarly, each mounting bracket 24a, 44a, may comprise a mounting base 24a', 44a' and an opposing base support block 24a", 44a" (e.g., wherein at least a portion of each opposing surface is arcuately configured in end-view cross-section to conformally sandwich the flexure member 30, 50, therebetween) and a connection means (e.g., one or more screws and nuts) for securing the mounting base 24a', 44a' and base support block 24a", 44a", respectively, to flexure member 30, 50. It should be noted that the mounting base 24a', 44a' and first support block 24b", 44b" also include opposing, end portions at the hinge joint 25, 45 which are arcuate and combinatively define a u-shaped configuration in top/bottom-view (as per FIGS. 1B and 3A), for providing substantially flat, face-to-face contact and conformal support of the flexure member 30, 50 at the hinge joint 25, 45 when in the stowed position. Additionally, each hinge support assembly 24, 44 includes a spring means 24c, 44c, such as a resilient, compressible button member, for absorbing vibratory shock communicated from the support surface 12 (e.g.,of the deployment bay) to the mounting base 24a', 44a', and for facilitating supporting contact of hinge support assembly 24, 44 with flexure member 30, 50 when the support boom structure 10 is in the stowed position. While spring member 24c, 44c is illustrated as being securely seated in block 24b", 44b", it could also be seated in mounting base 24a', 44a'.

The third support leg assembly 60 includes a lower hinge support assembly 62, an intermediate hinge support assembly 68, a flexure member 64 that serves as a flexure means for each of the lower and intermediate hinge assemblies 62, 68, a body member 72, an upper hinge support assembly 74, and an upper flexure member 76. The lower hinge support assembly 62 includes a mounting bracket 62a for rigidly mounting the third leg assembly 60 to the interior surface 12 of the deployment bay. As shown in FIGS. 1A and 1B, the base portions 24a', 44a', 62a' of the mounting brackets 24a, 44a, 62a of the first, second, and third leg support assemblies 20, 40, 60, respectively, are positioned so as to define an isosceles triangle on the interior surface 12 of the deployment bay, thereby enhancing the stability of the support boom structure 10 in both the stowed and in the deployed, cantilevered position.

The lower hinge support assembly 62 may comprise a first end of a first support member 62b for interconnection with flexure member 64. In this regard, the first support member 62b may comprise opposing first support blocks 62b' and 62b" (e.g., wherein at least a portion of each opposing surface is arcuately configured in end-view cross-section to conformly sandwich the flexure member 64 therebetween) and a connection means (e.g., one or more screw/nuts) for securing the first support member 62b to the flexure member 64. Similarly, mounting bracket 62a may comprise a mounting base 62a' and an opposing base support block 62a" (e.g., wherein each opposing surface is arcuately configured in end-view cross-section to conformly sandwich the flexure member 64 therebetween) and a connection means (e.g., one or more screws and nuts) for securing the mounting bracket 62a to flexure member 64. The mounting base 62a' and the first end of the first support block 62b" may include opposing, end portions at the hinge joint 63 which are arcuate and combinatively define a u-shaped configuration in top/bottom view (as per FIG. 1B) for providing substantially flat, face-to-face contact and conformal support of the flexure member 64 at the hinge joint 63 when in the stowed position. The lower hinge support assembly 62 may also include a spring means 62c, such as a resilient, compressible button member for absorbing vibratory shock communicated from the support surface 12 (e.g., of the deployment bay) to the mounting base 62a', and for facilitating supporting contact of hinge support assembly 62 with the flexure member 64 when the support boom structure 10 is in the stowed position. While the spring member 62 is illustrated as being seated in the first support block 62b", it could also be seated within the mounting base 62a'.

The intermediate hinge support assembly 68 is defined by a second end of the first support member 62b and a second support member 68b. In this regard, the second support member 68b may include opposing second support blocks 68b' and 68b" (e.g., wherein each opposing surface is arcuately configured in end-view cross-section to conformly sandwich the flexure member 64 therebetween) and a connection means (e.g., one or more screws/nuts) for securing the opposing second support blocks 68b', 68b" to the flexure member 64 as well as one end 72a of the body member 72. In the later regard, the body member 72 may be of the same rigid, tubular construction as body members 22 and 42. As will be appreciated, the flexure member 64 is of sufficient length to extend across both the lower hinge joint 63 as well as the intermediate hinge joint 65.

The upper hinge support assembly 74 includes a third support member 74a for interconnection to the second end 72b of the body member 72 and to flexure member 76. In this regard, the third support member 74a may comprise opposing third support blocks 74a' and 74a" (e.g., wherein each opposing surface is arcuately configured in end-view cross-section to conformly sandwich the flexure member 76 therebetween) and a connection means (e.g., one or more screws/nuts) for securing the opposing third support blocks 74a', 74a" to the flexure member 76 and body member 72. The third support assembly 74 may further comprise an end support member 78 that may comprise opposing block members and connection means for conformal interconnection with the flexure member 76 and rigid connection to mounting assembly 80. The flexure member 76 extends across the upper hinge joint 75 to further facilitate desired positioning and locking of the equipment mounting assembly 80 in the deployed position.

In the illustrated embodiment, each of the flexure members 30, 50, 64, 76 may preferably comprise the same or quite similar physical attributes to provide flexure means for pivoting the support boom structure 10 from the stowed position to the deployed, cantilevered position. Such functionality may not only provide for hinged movement of the support boom structure 10, but may also provide the driving force for the pivotal movement upon deployment and for locking the support boom structure 10 in the deployed position. For such purposes, each of the flexure members 30, 50, 64, 76 may be of an elongate and unitary construction.

More particularly, each of the flexure members 30, 50, 64, 70, 76 may be fabricated from various materials with adequate tensile strength and resilient characteristics (e.g., spring steel, beryllium copper and/or shape-memory alloy such as NiTi) to provide the spring force necessary for the flexure members 30, 50, 64, 76 to function as a resilient, self-pivoting hinge. To further facilitate flexing from a deformed, or bent configuration into a substantially straight configuration, and to rigidly maintain the support boom structure 10 in the deployed, cantilevered position, each of the flexure members 30, 50, 64, 76 may be fabricated to have a pre-stressed, arcuate cross-section (i.e., in end view) along the length thereof. By way of primary example, to readily achieve the above attributes, it has been found that each of the flexure members 30, 50, 64, 76 may advantageously comprise a length of what is commonly referred to as carpenter's tape (i.e., for measuring purposes).

As noted above, the support boom structure 10 includes a mounting assembly 80 to provide for the positioning and support of equipment that is to be deployed by the support boom structure 10. The mounting assembly 80 includes a base plate 82 that is rigidly interconnected by a connection means (e.g., one or more screws/nuts) to each of the second ends 22b, 42b, 72b of the body members 22, 42, 72 of the first, second and third support leg assemblies 20, 40, and 60, respectively. The base plate 82 of the mounting assembly 80 may also serve as the platform for equipment interface.

A release assembly 90 may be used in connection with the illustrated embodiment of the present invention. The release assembly 90 is rigidly mounted to the support surface 12 (e.g., within a deployment bay) and may provide for the retention of the support boom structure 10 in the stowed position and for the selective release of the retaining force when deployment is desired. In this regard, numerous different release mechanisms are known in the art and may be employed (see e.g., U.S. Pat. Nos. 5,695,306 or 5,603,595).

In use, the equipment that is to be deployed via the boom structure 10 may be mounted prior to launching the spacecraft on the mounting plate 82 of the mounting assembly 80. In the illustrated embodiment, the support boom structure 10 is positioned during stowage to be substantially parallel to the support surface 12 (e.g., interior surface of a satellite deployment bay) so as to reduce space requirements (e.g., inside of the deployment bay) and to minimize the forces acting upon the support boom 10 during transit. The support boom structure 10 is maintained in the stowed position during launching and flight by the release assembly 90, while the support boom structure 10 is in the compact, stowed position, the flexure members 30, 50, and 64, 76 of the first, second, and third support leg assemblies 20, 40, 60, respectively, are flexed, or bent, into a substantially u-shaped configuration, as shown in FIGS. 1B and 3A. By virtue of this flexing, a spring force is generated in each flexure member 30, 50, 64, 76. As discussed previously, each hinge support assembly 24, 44 and 62 provides for face-to-face contact and support of the flexure members 30, 50, 64, 76 in the stowed position. This face-to-face support reduces the risk of the flexure members 30, 50, 64, 76 being kinked or otherwise damaged during transit. Further, a separate support member 100 may be mounted to support surface 12 to provide an arcuate support surface 102 for engagement with flexure member 64 during stowage.

Flexure members 30, 50 are positioned within the first and second support leg assemblies 20 and 40, respectively, so that the u-shaped configuration of each flexure member 30, 40 faces the same direction during stowage (e.g., toward the release assembly 90). In this regard, the hinge or pivot axis for flexure members 30 and 40 is the same. Within the third support leg assembly 60, in the stowed position shown in FIG. 1B, the lower flexure member 64 is positioned to have a first u-shaped configuration facing one direction at joint 63 (i.e., toward the hinge support 24 of the first support leg assembly 20) and a second u-shaped configuration at joint 65 facing a substantially opposite direction (i.e., toward the release assembly 90 and away from the support surface 12, respectively). Flexure member 76 is also disposed to have a u-shaped configuration in the stowed position. Of note, the hinge or pivot axis for the flexure members 30, 50 are parallel to the hinge or pivot axes for the flexure members 64 and 76.

Upon reaching a preselected location for deployment (e.g., a desired satellite orbit position), the release assembly 90 is operated to cause disconnection with the base plate 82 of the mounting assembly 80, thereby releasing the support boom structure 10 from the stowed position. Each flexure member 30, 50, 64, 76 releases, at a relatively even rate, the spring force generated in each flexure member 30, 50, 64, 76 and resiliently flexes from the noted u-shaped configurations to substantially straight configurations within each of the first, second, and third support leg assemblies 20, 40, and 60. In this manner, each of the flexure members 30, 50, 64, and 76 acts as a substantially frictionless, self-pivoting hinge to smoothly position the interconnected members of the support boom structure 10 from the stowed to the deployed, cantilevered position. The pivoting, spring force developed within each of the flexure members 30, 50, 64, 70, 76 acts substantially along its central axis. Because each of these central axes are parallel, the pivoting forces of flexure members can work in combination to provide the force necessary to deploy the support boom structure 10 which reduces the need to oversize any individual flexure member. Alternatively, it may be preferable for each of the flexure members 30, 50 and 64, to separately yield sufficient driving force to effect the desired deployment of boom 10 so as to yield three-fold redundancy in the event of the failure of any one or two of the three flexure members.

Upon reaching the deployed position shown in FIGS. 2 and 3B, each of the flexure members 30, 50, 64, 76 latches in the substantially straight position, due to its arcuate cross-section which resists flexing from the straight position. In this manner, the first, second, and third support legs 20, 40, and 60, respectively, and, thereby the support boom structure 10, are all rigidly maintained in the deployed, cantilevered position. As illustrated in FIG. 2, the support boom structure 10 in the deployed, cantilevered position may be positioned at an angle greater than 90 degrees relative to the interior surface 12 of the deployment bay. This greater than 90-degree, deployed, cantilevered position may be advantageously provided to enhance the range of vision for equipment mounted on the boom structure 10.

While the present invention has been described in relation to one embodiment, numerous additional embodiments it will be apparent to those skilled in the art. Such additional embodiments are within the scope of the present invention as defined by the claims that follow.

What is claimed is:

1. A support boom interconnectable with a support surface and positional from a stowed position to a deployed, cantilevered position, said support boom comprising:

a first support leg pivotally mountable at a first end to said support surface when said support boom is attached to said support surface;

a second support leg pivotally mountable at a first end to said support surface when said support boom is attached to said support surface, wherein a second end of said first support leg and a second end of said second support leg are interconnected to define a support boom structure; and a flexure means for pivoting said support boom structure from a stowed position to a deployed, cantilevered position, wherein said flexure means comprises at least one flexure member, said flexure member being disposed to resiliently flex from a first position to a second position, said flexure member being elongated with an arcuate cross sectional configuration when straight, wherein said flexure member resiliently flexes from a substantially u-shaped configuration in said first position to a substantially straight configuration in said second position.

2. A support boom, as recited in claim 1, further comprising:

a third support leg pivotally mountable at a first end to said support surface when said support boom is attached to said support surface, said first ends of said first, second, and third support legs being mountable to said support surface at first, second, and third mounting locations when said support boom is attached to said support surface, said mounting locations defining a polygonal configuration, wherein a second end of said third support leg is interconnected with said second ends of said first and second support legs to further define said support boom structure.

3. A support boom, as recited in claim 2, wherein said mounting locations define an acute triangular configuration.

4. A support boom, as recited in claim 2, said flexure means comprising:

at least one of said flexure members interposed within each of said support legs.

5. A support boom, as recited in claim 4, each of said flexure members being elongated with an arcuate cross-sectional configuration when straight, wherein each of said flexure members resiliently flexes from a substantially u-shaped, folded configuration in said first position to a substantially straight configuration along an entire length thereof in said second position for maintaining said support boom structure in the deployed, cantilevered position.

6. A support boom, as recited in claim 5, said flexure means comprising:

at least two of said flexure members interposed within one of said support legs.

7. A support boom, as recited in claim 6, said at least two flexure members being positioned wherein in said first position at least one of said u-configurations faces a substantially opposite direction from the other of said u-shaped configurations.

8. A support boom, as recited in claim 6, wherein said support boom structure has a center axis that pivots in a plane when said support boom structure is pivoted from said stowed position to said deployed, cantilevered position, and wherein said one of said support legs pivots in said plane when said support boom structure is pivoted from said stowed position to said deployed, cantilevered position.

9. A support boom, as recited in claim 4, wherein said support legs each include at least one hinge support including a portion that has an arcuate cross-sectional configuration, each said hinge support portion being disposed in face-to-face relation with at least a portion of a corresponding flexure member.

10. A support boom, as recited in claim 9, wherein said hinge support includes a first support member and a second support member, said first and second support members being interconnected to define joint therebetween, and wherein adjacent portions of the first and second support members combinatively define a u-shaped configuration for supportably contacting a u-shaped portion of the corresponding flexure member when said support legs are in a stowed position.

11. A support boom, as recited in claim 10, wherein at least one hinge support further comprises a spring means interposed between the corresponding first and second support members for tensioning the corresponding flexure member when the corresponding support legs are in the stowed position.

12. A support boom, as recited in claim 4, wherein each of said flexure members have a central axis, and wherein said central axes are substantially parallel.

13. A support boom, as recited in claim 1, wherein said flexure member comprises a metal selected from a group comprising: spring steel, beryllium copper and a shape memory alloy.

14. A support boom, as recited in claim 13, wherein said flexure member is pretensioned in the stowed position with a predetermined spring force.

15. A support boom, as recited in claim 14, wherein said flexure member releases said predetermined spring force at a predetermined rate to pivot said boom support structure from the stowed position to the deployed, cantilevered position.

16. A support boom, as recited in claim 1, wherein a hinge portion of said flexure member is of a substantially flat, cross-sectional configuration in said first position, and wherein hinge portion of said flexure member latches into a straight configuration in said second position to lock said support boom in the deployed, cantilevered position.

17. A support boom, as recited in claim 1, said first and second support legs being positioned such that a longitudinal axis of said first support leg and a longitudinal axis of said second support leg are nonparallel.

18. A support boom, as recited in claim 1, wherein said boom support structure is positionable substantially parallel to said support surface in the stowed position when said support boom is attached to said support surface, and wherein said boom support structure is positionable at an angle greater than about 90 degrees in the deployed, cantilevered position, said angle being measured from said support surface to a plane containing a longitudinal axis of said first support leg and a longitudinal axis of said second support leg.

19. A support boom, as recited in claim 1, said flexure means comprising:

at least one of said flexure members interposed within each of said first and second support legs.

20. A support boom interconnectable with a support surface and positionable from a stowed position to a deployed, cantilevered position, said support boom comprising:

a first support leg pivotally mounted at a first mounting location on said support surface when said support boom is attached to said support surface;

a second support leg pivotally mounted at a second mounting location on said support surface when said support boom is attached to said support surface;

a third support leg pivotally mounted at a third mounting location on said support surface when said support boom is attached to said support surface, said first, second and third mounting locations defining a polygonal configuration, wherein the first, second and third support legs are interconnected at distal ends to define a support boom structure and wherein said support boom structure comprises a free end; and a flexure means interposed within at least one of said first, second and third support legs for automatically driving, in a pivotal manner, said support boom structure from a stowed position to a deployed, cantilevered position, and for maintaining said support boom structure in said deployed, cantilevered position by pivoting said free end of said support boom structure along an at least generally arcuate path orthogonally away from and relative to said support surface and at least generally towards each of said first, second, and third mounting locations when said support boom is attached to said support surface.

21. A support boom, as recited in claim 20, wherein said flexure means comprises a plurality of separate flexure members.

22. A support boom, as recited in claim 21, wherein a separate one of said flexure members is interposed within each of said first, second and third support legs.

23. A support boom interconnectable with a support surface and positional from a stowed position to a deployed, cantilevered position, said support boom comprising:

a first support leg pivotally mountable at a first end to said support surface when said support boom is attached to said support surface;

a second support leg pivotally mountable at a first end to said support surface when said support boom is attached to said support surface, wherein a second end of said first support leg and a second end of said second support leg are interconnected to define a support boom structure;

a third support leg pivotally mountable at a first end to said support surface when said support boom is attached to said support surface, said first ends of said first, second, and third support legs being mountable to said support surface at first, second, and third mounting locations when said support boom is attached to said support surface, said mounting locations defining a polygonal configuration, wherein a second end of said third support leg is interconnected with said second ends of said first and second support legs to further define said support boom structure; and a flexure means for pivoting said support boom structure from a stowed position to a deployed, cantilevered position, wherein said flexure means comprises at least one flexure member interposed within each of said support legs, each said flexure member being disposed to resiliently flex from a first position to a second position, each of said flexure members being elongated with an arcuate cross-sectional configuration when straight, wherein each of said flexure members resiliently flexes from a substantially u-shaped, folded configuration in said first position to a substantially straight configuration along an entire length thereof in said second position for maintaining said support boom structure in the deployed, cantilevered position.

24. A support boom interconnectable with a support surface and positional from a stowed position to a deployed, cantilevered position, said support boom comprising:

a first support leg pivotally mountable at a first end to said support surface when said support boom is attached to said support surface;

a second support leg pivotally mountable at a first end to said support surface when said support boom is attached to said support surface, wherein a second end of said first support leg and a second end of said second support leg are interconnected to define a support boom structure;

a third support leg pivotally mountable at a first end to said support surface when said support boom is attached to said support surface, said first ends of said first, second, and third support legs being mountable to said support surface at first, second, and third mounting locations when said support boom is attached to said support surface, said mounting locations defining a polygonal configuration, wherein a second end of said third support leg is interconnected with said second ends of said first and second support legs to further define said support boom structure; and a flexure means for pivoting said support boom structure from a stowed position to a deployed, cantilevered position, wherein said flexure means comprises at least one flexure member interposed within each of said support legs, each said flexure member being disposed to resiliently flex from a first position to a second position, wherein said support legs each include at least one hinge support including a portion that has an arcuate cross-sectional configuration, each said hinge support portion being disposed in face-to-face relation with at least a portion of a corresponding flexure member.

25. A support boom interconnectable with a support surface and positionable from a stowed position to a deployed, cantilevered position, said support boom comprising:

a first support leg assembly comprising a first flexure and first and second ends, said first end being interconnectable with said support surface at a first mounting location when said support boom is attached to said support surface;

a second support leg assembly comprising a second flexure and third and fourth ends, said third end being interconnectable with said support surface at a second mounting location when said support boom is attached to said support surface, wherein said first and second mounting locations are spaced along a first reference axis, wherein a direction of said first reference axis or any axis parallel therewith defines a lateral direction;

a third support leg assembly comprising a third flexure and fifth and sixth ends, wherein said second, fourth, and sixth ends are interconnected, wherein said support boom comprises a free end, wherein said fifth end is interconnectable with said support surface at a third mounting location when said support boom is attached to said support surface, and wherein when said support boom is in said stowed position said free end of said support boom is on a first side of said first reference axis and spaced therefrom along a second reference axis, wherein a direction of said second reference axis or any axis parallel therewith defines a longitudinal direction, and wherein said third mounting location is disposed laterally between said first and second mounting locations and longitudinally between said first reference axis and said free end of said support boom when said support boom is in said stowed position.

26. A support boom, as recited in claim 25, wherein:

said first, second, and third support leg assemblies each extend from said support surface in an orientation whereby said free end of said support boom is disposed on a second side of said first reference axis which is opposite said first side when said support boom is in said deployed position.

27. A support boom, as recited in claim 25, wherein:

said third support leg assembly further comprises a fourth flexure disposed between said third flexure and said sixth end.

28. A support boom, as recited in claim 27, wherein:

said third flexure is at least generally proximate said third mounting location, and wherein when said support boom is in said stowed position, said fourth flexure is disposed longitudinally between said third flexure and said first reference axis.

29. A support beam, as recited in claim 27, wherein:

said third flexure is bent in a first direction and said fourth flexure is bent in a second direction when said support boom is in said stowed position, said second direction being at least generally opposite said first direction.

* * * * *

UNITED STATES PATENT AND TRADEMARK OFFICE
CERTIFICATE OF CORRECTION

PATENT : 6,062,527
DATED : May 16, 2000
INVENTOR(S) : NYGREN

It is certified that error appears in the above-identified patent and that said Letters Patent is hereby corrected as shown below:

At Column 14, Claim 29, line 3, please delete "beam" and insert therefor --boom--.

Signed and Sealed this

Twentieth Day of March, 2001

Attest:

NICHOLAS P. GODICI

*Attesting Officer*  *Acting Director of the United States Patent and Trademark Office*